(12) United States Patent
Neuman et al.

(10) Patent No.: US 12,728,766 B2
(45) Date of Patent: Sep. 8, 2026

(54) INTELLIGENT VEHICLES, CHARGING SYSTEMS, AND CONTROL LOGIC FOR V2X DEMAND-RESPONSE INCOME AND CAPACITY OPTIMIZATION

(71) Applicant: GM GLOBAL TECHNOLOGY OPERATIONS LLC, Detroit, MI (US)

(72) Inventors: Christopher R. Neuman, Royal Oak, MI (US); Sudhakar Inguva, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 918 days.

(21) Appl. No.: 18/083,699

(22) Filed: Dec. 19, 2022

(65) Prior Publication Data

US 2024/0198852 A1 Jun. 20, 2024

(51) Int. Cl.
*H02J 7/00* (2026.01)
*B60L 55/00* (2019.01)
*B60L 58/16* (2019.01)
*H02J 7/14* (2006.01)

(52) U.S. Cl.
CPC ............... *B60L 58/16* (2019.02); *B60L 55/00* (2019.02); *B60L 2240/70* (2013.01); *B60L 2250/16* (2013.01); *B60L 2260/50* (2013.01)

(58) Field of Classification Search
CPC ...... B60L 58/16; B60L 55/00; B60L 2240/70; B60L 2250/16; B60L 2260/50
USPC .......................................................... 320/127
See application file for complete search history.

(56) References Cited

U.S. PATENT DOCUMENTS 7,360,615 B2 4/2008 Salman et al.
8,170,818 B2 5/2012 Jian et al.
8,214,122 B2 7/2012 Krupadanam et al.
8,531,158 B2 9/2013 Wang et al.
9,091,735 B2 7/2015 Wang et al.
9,566,868 B2 * 2/2017 Jammer ................ B60L 53/665
9,754,300 B2 * 9/2017 Kempton ........... G06Q 30/0601
9,989,373 B2 6/2018 Jeki
(Continued)

OTHER PUBLICATIONS

U.S. Appl. No. 17/990,808, filed Nov. 21, 2022; not yet published.

*Primary Examiner* — Alexis B Pacheco
(74) *Attorney, Agent, or Firm* — Quinn IP Law

(57) ABSTRACT

Presented are charging systems for provisioning vehicle grid integration (VGI) demand-response (DR) activities, methods for making/using such systems, and vehicles with bidirectional charging and VGI DR capabilities. A method of controlling VGI operations for a host vehicle includes a resident/remote vehicle controller receiving user-specific data input by the host vehicle's operator and crowd-sourced data output by third-party vehicles deemed comparable to and located within a predefined region of the host vehicle. A predicted battery life of the battery pack resulting from the host vehicle performing VGI operations is estimated using a non-iterative, non-recursive closed-form battery life model based on the user-specific and crowd-sourced data. The controller uses the predicted battery life to determine a value proposition indicating a predicted value and battery capacity for performing VGI operations, and commands a resident subsystem of the host vehicle to execute a control operation for the VGI operation based on the value proposition.

20 Claims, 2 Drawing Sheets

(56) References Cited

U.S. PATENT DOCUMENTS 10,809,733 B2 10/2020 Lindemann et al.
11,264,825 B1 * 3/2022 Harris .................... H02J 7/342
11,383,607 B1 * 7/2022 Prasad .................... B60L 53/24
11,444,338 B1 * 9/2022 Dhawan .............. H01M 50/569
2009/0030712 A1 1/2009 Bobolea et al.
2011/0302078 A1 * 12/2011 Failing ...................... H02J 7/42 700/297
2012/0049792 A1 * 3/2012 Crombez .............. H01M 10/44 320/109
2014/0088804 A1 * 3/2014 Hyde ...................... B60L 53/12 701/22
2016/0285296 A1 9/2016 Namou et al.
2016/0356616 A1 12/2016 Woon et al.
2017/0015208 A1 * 1/2017 Dunlap ................... B60L 50/15
2017/0136881 A1 * 5/2017 Ricci ....................... B60L 5/005
2017/0299401 A1 10/2017 Jin et al.
2018/0086212 A1 * 3/2018 Dudar ..................... B60L 53/12
2019/0275894 A1 * 9/2019 Amacker .............. H04L 9/3239
2019/0351783 A1 * 11/2019 Goei ...................... G08G 1/202
2020/0262305 A1 * 8/2020 Chakraborty ........... B60L 53/57
2020/0353839 A1 11/2020 Tarchinski et al.
2021/0049712 A1 * 2/2021 Devaraj .................. B60L 53/68
2021/0349157 A1 * 11/2021 Srinivasan ........... G01R 31/389
2022/0194253 A1 * 6/2022 Salter ...................... B60L 53/18
2022/0285971 A1 * 9/2022 Gannamaneni ....... B60L 53/305
2022/0355697 A1 11/2022 Wiebenga et al.
2023/0012166 A1 * 1/2023 Disley ..................... B60L 53/66

* cited by examiner

INTELLIGENT VEHICLES, CHARGING SYSTEMS, AND CONTROL LOGIC FOR V2X DEMAND-RESPONSE INCOME AND CAPACITY OPTIMIZATION

INTRODUCTION

The present disclosure relates generally to electrical systems for charging motor vehicles. More specifically, aspects of this disclosure relate to systems, methods, and devices for provisioning intelligent vehicle charging and vehicle grid integration activities.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, rechargeable battery cells, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of electricity between the traction motors and the rechargeable battery packs that supply the requisite power for operating many hybrid-electric and full-electric powertrains. To provide the power capacity and energy density needed to propel a vehicle at desired speeds for desired ranges, contemporary traction battery packs group multiple battery cells (e.g., 8-16+ cells/stack) into individual battery modules (e.g., 10-40+ modules/pack) that are electrically interconnected in series or parallel and mounted onto the vehicle chassis, e.g., by a battery pack housing or support tray. Located on a battery side of the HV electric system is a front-end DC-to-DC power converter that is electrically connected to the traction battery pack(s) in order to increase the supply of voltage to a main DC bus and a DC-to-AC power inverter module (PIM). Arranged across the positive and negative terminals of the main DC bus is a high-frequency bulk capacitor that provides electrical stability and stores supplemental electrical energy. A dedicated Electronic Battery Control Module (EBCM), through collaborative operation with a Powertrain Control Module (PCM) and each motor's power electronics package, governs operation of the battery pack(s) and traction motor(s).

As hybrid and electric vehicles become more prevalent, infrastructure is being developed and deployed to make day-to-day use of such vehicles feasible and convenient. Electric vehicle supply equipment (EVSE) for recharging electric-drive vehicles comes in many form factors, including residential electric vehicle charging stations (EVCS) that are purchased and operated by a vehicle owner (e.g., installed in the owner's garage), publicly accessible EVCS offered by public utilities or private retailers (e.g., at municipal or commercial charging facilities), and advanced high-voltage, fast-charging stations used by manufacturers, dealers, and service stations. Plug-in hybrid and electric vehicles can be recharged by physically connecting a charging cable of the EVCS to a matching charging port on the vehicle body. Wireless charging systems utilize electromagnetic field (EMF) induction or other wireless power transfer (WPT) technology to provide vehicle charging capabilities without the need for charging cables and ports. Vehicle electrification presents an opportunity, through charging infrastructure and strategy, to contribute to the capacity and reliability of public power grids. Vehicles may contribute through participation in vehicle grid integration (VGI) activities by altering charging behaviors and supporting two-way reverse power flow (RPF) between the vehicle battery system and the public utility.

SUMMARY

Presented herein are vehicle charging systems with attendant control logic for provisioning VGI demand-response (DR) activities, methods for making and methods for operating such charging systems, and electric-drive vehicles with bidirectional charging and VGI DR capabilities. In an example, a V2X middleware computing service facilitates VGI-RPF operations (i.e., vehicle-to-grid (V2G) discharge) with reduced battery capacity degradation by deriving income optimization strategies while preserving user-defined range expectations through active bidirectional charge optimization. Income generation optimization may be achieved by tailoring battery life modeling on an individual-user basis to optimize income from V2G/B/I based on personal usage and environmental factors while retaining desired battery capacity and vehicle range. To preserve range and capacity thresholds, a VGI-RPF operational strategy may be tailored to each user by seeding initial battery life data from crowd-sourced regionally and functionally similar vehicles, modeling battery life from this seeded data in conjunction with user-specific data, and deriving a value proposition based on a life model run, real-time public utility commission (PUC) rates, and individual user throughput capacity. The user-specific VGI-RPF operational strategy may be continuously updated and optimized based on individualized duty cycle information; over time, crowd-sourced data may be phased out with an increased reliance on user-specific and vehicle-specific data.

Attendant benefits for at least some of the disclosed concepts include vehicle charging systems and methods that enable vehicle operators to participate in VGI activities, including demand response (DR) initiatives like V2G-RPF programs, without significantly eroding battery life or vehicle range expectancy. Regulating when and the manner in which vehicles participate in V2G RPF activities in accord with disclosed concepts may boost regular user participation and maintain battery capacity while concomitantly reducing warranty claims for the battery pack. Other attendant benefits may include offsetting the costs of purchasing and using an electric-drive vehicle through income generated from selling vehicle-stored energy. Disclosed concepts may facilitate higher adoption of V2G operation by developing a robust and reliable V2G framework. Moreover, implementing individually tailored VGI-RPF operational strategies will help to alleviate user concerns about participating in V2G by minimizing battery degradation and vehicle range loss.

Aspects of this disclosure are directed to vehicle charging control systems, system control logic, and memory-stored instructions for provisioning V2X income and capacity optimization. In an example, a method is presented for controlling a VGI operation of a host vehicle, which is equipped with a rechargeable battery pack that is connectable to a vehicle charging station. This representative method includes, in any order and in any combination with any of the above and below disclosed options and features: receiving, e.g., via a resident controller, a remote controller, or a network of resident/remote controllers (collectively "controller" or "vehicle controller") from an in-vehicle HMI or a personal computing device, user-specific data that is input by an operator of the host vehicle; receiving, e.g., via the vehicle controller, crowd-sourced data output by a select set of third-party vehicles deemed operatively comparable to the host vehicle and located within a predefined proximity or location (collectively "region") of the host vehicle; estimating, e.g., by a back office (BO) cloud computing service using a non-iterative, non-recursive closed-form battery life model based, at least in part, on the user-specific and crowd-sourced data, a predicted battery life of the host vehicle's rechargeable battery pack resulting from the host vehicle performing a VGI operation; determining, e.g., via the controller using the predicted battery life, a value proposition indicative of a predicted value and a predicted battery capacity for the host vehicle performing a VGI operation; and transmitting, e.g., via the controller, one or more command signals to one or more resident subsystems of the host vehicle to execute one or more automated control operations for the VGI operation based, at least in part, on the value proposition.

Aspects of this disclosure are also directed to computer-readable media (CRM) for provisioning V2X income and capacity optimization. In an example, a non-transitory CRM stores instructions executable by one or more processors of a vehicle controller to control a vehicle grid integration operation of a host vehicle. These instructions, when executed by the processor(s), cause the controller to perform operations, including: receiving user-specific data input by an operator of the host vehicle; receiving crowd-sourced data output by third-party vehicles deemed operatively comparable to the host vehicle and located within a predefined region of the host vehicle; estimating, using a non-iterative and non-recursive closed-form battery life model based on the user-specific data and the crowd-sourced data, a predicted battery life of the rechargeable battery pack resulting from the host vehicle performing the VGI operation; determining, using the predicted battery life, a value proposition indicating a predicted value and a predicted battery capacity for the host vehicle performing the VGI operation; and transmitting a command signal to a resident subsystem of the host vehicle to execute an automated control operation for the VGI operation based on the value proposition.

Additional aspects of this disclosure are directed to motor vehicles with bidirectional charging and VGI DR capabilities. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles, motorcycles, farm equipment, watercraft, e-bikes, etc. In an example, a motor vehicle includes a vehicle body with a passenger compartment, multiple road wheels mounted to the vehicle body (e.g., via corner modules coupled to a unibody or body-on-frame chassis), and other standard original equipment. For electric-drive vehicle applications, one or more electric traction motors operate alone (e.g., for FEV powertrains) or in conjunction with an internal combustion engine assembly (e.g., for HEV powertrains) to drive one or more of the road wheels and propel the vehicle. A rechargeable traction battery pack is mounted onto the vehicle body and operable to power the traction motor(s).

Continuing with the preceding discussion, the vehicle is also equipped with a resident, remote, or networked controller that is programmed to execute various automated vehicle control operations. For example, the controller receives, either directly or through a third-party intermediary, user-specific data input by an operator of the vehicle and crowd-sourced data generated by third-party vehicles deemed operatively comparable to and located within a predefined region of the subject vehicle. From this data, the controller executes, either directly or through a third-party intermediary, a non-iterative and non-recursive closed-form battery life model to estimate a predicted battery life of the subject vehicle's battery pack resulting from the vehicle performing a VGI operation. Using the predicted battery life, the controller then determines/receives a value proposition indicating a predicted value and battery capacity for the subject vehicle performing a VGI operation. The controller then commands a resident subsystem of the subject vehicle to execute an automated control operation for the VGI operation based on the value proposition.

For any of the disclosed systems, methods, and vehicles, the vehicle controller may receive real-time public utility company rate data for purchasing electrical power from the host vehicle. In this instance, determining the value proposition is also based on the received utility company rate data. As another option, the vehicle controller may receive vehicle throughput data from the host vehicle that is indicative of a real-time amount of energy presently available from the host vehicle for VGI RPF. In this instance, determining the value proposition is also based on the vehicle throughput data. As another option, the predicted value provided in the value proposition may include an estimated total income the host vehicle operator will receive by performing a single or multiple VGI operations. Moreover, the predicted battery capacity in the value proposition may include a plot of a percent battery degradation as a function of battery life expectancy.

For any of the disclosed systems, methods, and vehicles, the vehicle controller may perform an input convergence of the user-specific and crowd-sourced data by repeatedly receiving updated user-specific data and, once received, responsively replacing the user-specific data with the updated user-specific data in order to converge on an average use case that is specific to the host vehicle. In this instance, the controller may estimate a new predicted battery life each time a set of the updated user-specific data is received using the battery life model based on a reduced portion of the crowed-sourced data and on the updated user-specific data. As another option, the user-specific data input by the host vehicle operator may include confirmation that the host vehicle is configured to perform VGI operations and/or a charging station to which the host vehicle is connectable is a bidirectional charger. Optionally, the user-specific data input by the host vehicle operator may include a user-selected maximum allowable battery capacity degradation and/or a user-selected minimum allowable vehicle driving range.

For any of the disclosed systems, methods, and vehicles, the battery life model may include a multiparameter hypergeometric function of a calendar life test data parameter and a cycle life data parameter. The model may be non-iterative in that it does not require capturing battery degradation data for each day, and non-recursive in that it does not require battery capacity degradation data of a previous day to estimate a current day's capacity degradation. For at least some system architectures, the vehicle controller includes a resident vehicle controller, which is resident to the host vehicle, and a remote vehicle controller of a middleware computing service, which is remote from the host vehicle. In this instance, the resident vehicle controller receives the user-specific data and transmits the command signals, whereas the remote vehicle controller receives the crowd-sourced data, estimates the predicted battery life, and determines the value proposition.

For any of the disclosed systems, methods, and vehicles, the host vehicle's resident subsystem may include an Electronic Battery Control Module; in this instance, the automated control operation includes the EBCM preventing the host vehicle from performing the VGI operation (e.g., when battery degradation is too high or estimated income is too low). As another option, the host vehicle's resident subsystem may include an electronic display device (e.g., telematics unit display) that is mounted inside the host vehicle's passenger compartment; in this instance, the automated control operation includes the display device displaying the value proposition, including the predicted value and/or the predicted battery capacity degradation, to the vehicle occupant(s). As another option, the telematics unit may wirelessly transmit one or more electronic notifications with an alert indicative of the value proposition to a wireless or cellular-enabled computing device of the host vehicle's operator or owner. The resident vehicle subsystem may include one or more electrical contactors that selectively connect/disconnect the vehicle's battery system to/from the vehicle charging station. In this instance, the control operation may include closing/opening the electrical contactor(s) to thereby electrically connect/disconnect the battery system to/from the vehicle's HV electrical system and, thus, the charging station.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
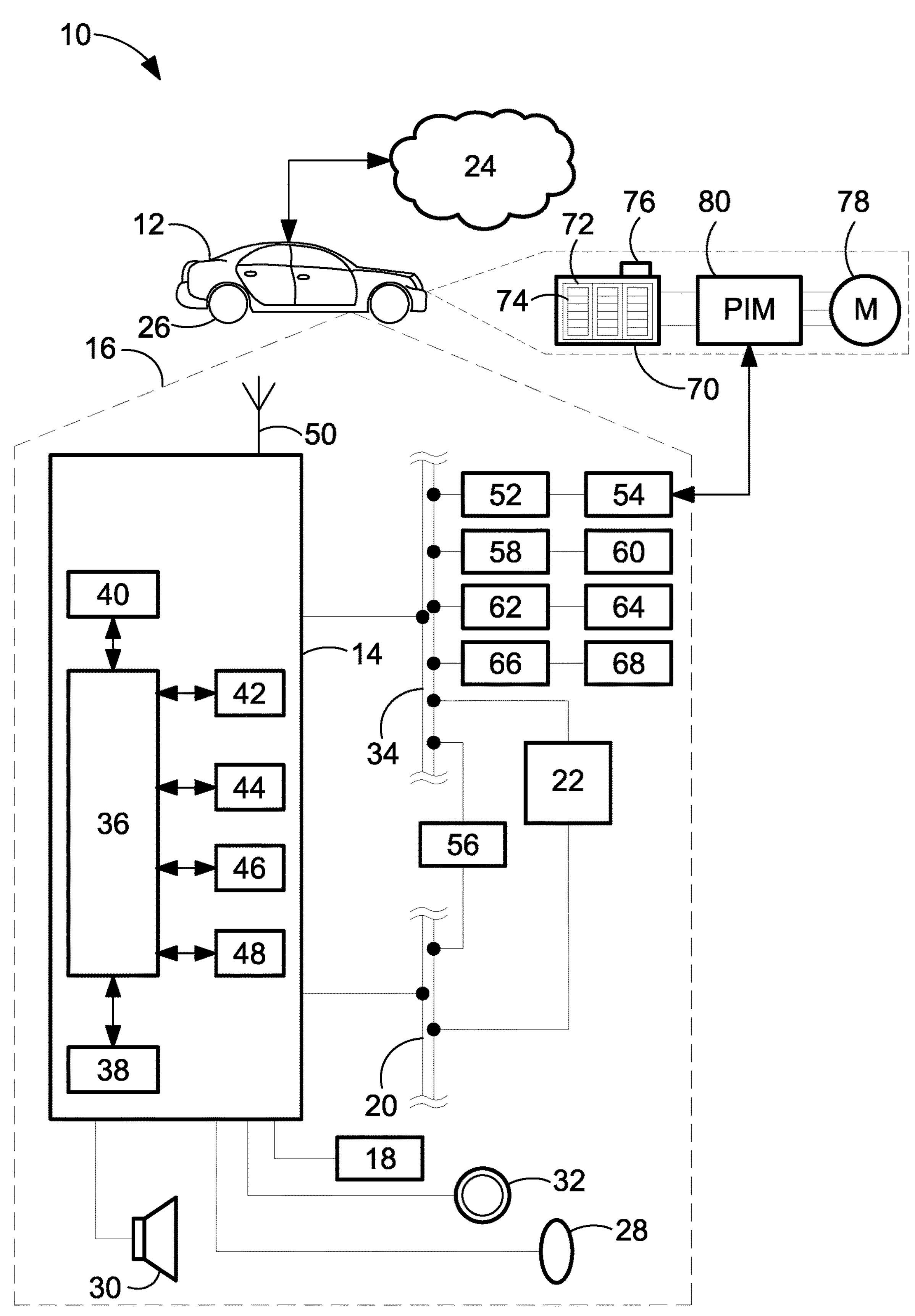
FIG. 1 is a partially schematic, side-view illustration of a representative electric-drive motor vehicle with a rechargeable traction battery pack and a network of in-vehicle controllers, sensing devices, and communication devices for executing intelligent vehicle charging and VGI operations in accord with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, incorporation of the present concepts into an FEV powertrain should also be appreciated as a non-limiting implementation of disclosed features. As such, it will be understood that aspects and features of this disclosure may be applied to other powertrain architectures, may be incorporated into any logically relevant type of vehicle, and may be employed for various types of V2X operations. Moreover, only select components of the motor vehicle and intelligent vehicle control system are shown and described in additional detail herein. Nevertheless, the vehicles and systems discussed below may include numerous additional and alternative features, and other available peripheral components, for carrying out the various methods and functions of this disclosure.

The representative vehicle 10 of FIG. 1 is originally equipped with a vehicle telecommunications and information ("telematics") unit 14 that wirelessly communicates, e.g., via cell towers, base stations, mobile switching centers, satellite service, etc., with a remotely located or "off-board" cloud computing host service 24 (e.g., ONSTAR®). Some of the other vehicle hardware components 16 shown generally in FIG. 1 include, as non-limiting examples, an electronic video display device 18, a microphone 28, audio speakers 30, and assorted user input controls 32 (e.g., buttons, knobs, pedals, switches, touchpads, joysticks, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with a means to input verbal or other auditory commands; the vehicle 10 may be equipped with an embedded voice-processing unit utilizing audio filtering, editing, and analysis modules. Conversely, the speakers 30 provide audible output to a vehicle occupant and may be either a stand-alone speaker dedicated for use with the telematics unit 14 or may be part of an in-cabin audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating friction and regenerative brake systems, controlling vehicle steering, regulating charge and discharge of a vehicle battery pack, and other automated functions. For instance, telematics unit 14 may exchange signals with a Powertrain Control Module (PCM) 52, an Advanced Driver Assistance System (ADAS) module 54, an Electronic Battery Control Module (EBCM) 56, a battery charging module (BCM) 58, a Brake System Control Module (BSCM) 60, and assorted other vehicle ECUs, such as body control module (BCM), a Steering Control Module (SCM), an engine control module (ECM), a Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with remote, off-board devices may be provided via one or more or all of a cellular chipset/component, a navigation and location chipset/component (e.g., global positioning system (GPS) transceiver), or a wireless internet protocol (IP) modem, all of which are collectively represented at 44. Close-range wireless connectivity may be provided via a short-range communication (SRC) device 46 (e.g., a BLUETOOTH® unit or near field communications (NFC) transceiver), a dedicated short-range communications (DSRC) component 48, and/or a dual antenna 50. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of automation and concomitant autonomous vehicle operation.

To propel the motor vehicle 10, an electrified powertrain is operable to generate and deliver tractive torque to one or more of the vehicle's drive wheels 26. The powertrain is generally represented in FIG. 1 by an electric traction motor (M) 78 that is operatively connected to a rechargeable energy storage system (RESS), which may be in the nature of a chassis-mounted traction battery pack 70. The traction battery pack 70 is generally composed of one or more battery modules 72 each containing a cluster or stack of battery cells 74, such as lithium-class, zinc-class, nickel-class, or organosilicon-class cells of the pouch, can, or cylindrical type. One or more electric machines, such as traction motor/generator (M) unit(s) 78, draw electrical power from and, optionally, deliver electrical power to the battery pack 70. A power inverter module (PIM) 80 electrically connects the battery pack 70 to the motor(s) 78 and modulates the transfer of electrical current therebetween. Disclosed concepts are similarly applicable to HEV and ICE-based powertrains. The battery pack 70 may be designed such that module management, cell sensing, module-to-module and/or module-to-host communication functionality, etc., is integrated directly into each battery module 72 and performed by an integrated electronics package, such as a wireless-enabled cell monitoring unit (CMU) 76.

Figure 2:
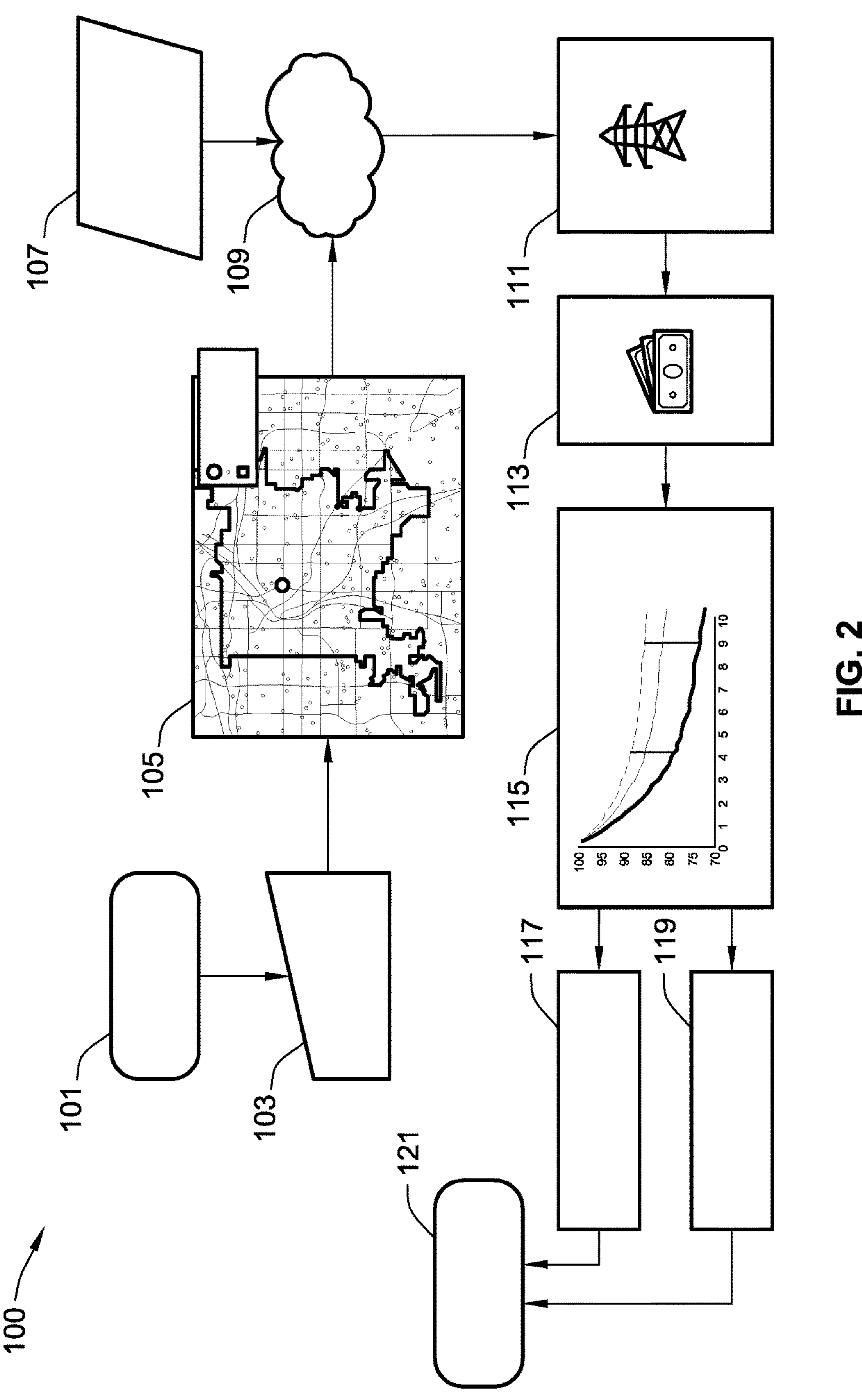
FIG. 2 is a flowchart illustrating a representative intelligent vehicle charging algorithm for governing VGI-RPF operations for income and capacity optimization, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 2, an improved method or control strategy for executing V2X processes, such as a VGI-RPF charging operation, for motor vehicles, such as plug-in, full-electric automobile 10 of FIG. 1, is generally described at 100 in accordance with aspects of the present disclosure. Some or all of the operations illustrated in FIG. 2 and described in further detail below may be representative of an algorithm that corresponds to non-transitory, processor-executable instructions that are stored, for example, in main or auxiliary or remote memory (e.g., memory device 38 of FIG. 1), and executed, for example, by an electronic controller, processing unit, logic circuit, or other module or device or network of modules/devices (e.g., CPU 36 and/or cloud computing service 24 of FIG. 1), to perform any or all of the above and below described functions associated with the disclosed concepts. It should be recognized that the order of execution of the illustrated operation blocks may be changed, additional operation blocks may be added, and some of the herein described operation blocks may be modified, combined, or eliminated.

Method 100 begins at START terminal block 101 of FIG. 2 with memory-stored, processor-executable instructions for a programmable controller or control module or similarly suitable processor to call up an initialization procedure for a V2X control protocol. This routine may be executed in real-time, near real-time, continuously, systematically, sporadically, and/or at regular intervals, for example, each 10 or 100 milliseconds during regular and routine operation of the motor vehicle 10. As yet another option, terminal block 101 may initialize responsive to a user command prompt (e.g., via input controls 32), a resident vehicle controller prompt (e.g., from CPU 36 or EBCM 56), or a broadcast prompt signal received from a centralized back-office (BO) vehicle services system (e.g., host cloud computing service 24). To carry out this protocol, a vehicle control system or any combination of one or more subsystems may be operable to receive, process, and synthesize pertinent information and inputs, and execute control logic and algorithms to regulate various battery system, powertrain system, and/or communications system components to achieve desired control targets. Upon completion of some or all of the control operations presented in FIG. 2, the method 100 may advance to END terminal block 121 and temporarily terminate or, optionally, may loop back to terminal block 101 and run in a continuous loop.

From terminal block 101, method 100 advances to CUSTOMER ENROLLMENT manual input block 103 at which a user selects to participate in V2X. In a non-limiting example, a BO vehicle services system, such as cloud computing service 24 of FIG. 1, may transmit a prompt to a driver of a host vehicle (e.g., via telematics unit 14 of vehicle 10) to participate in a VGI-RPF charging operation. For instances in which the vehicle is being driven by a person other than the owner or is unoccupied, the prompt may be transmitted directly to the vehicle owner (owner, driver, and occupant may be collectively referred to as "user" or "operator"). At the time of purchasing a motor vehicle, for example, a user may be solicited to enroll in an income optimization plan through which they selectively participate in VGI demand-response (DR) activities. In doing so, the user may generate supplemental income by selling vehicle-stored energy back to a public utility grid (V2G) or other third-party electrical load (V2I/V2G/V2B, etc.). The user may "opt in" to an income optimization plan in which the BO vehicle services system operates as a middleware management node that facilitates the power transfer while managing limits of what, when and how much can be sold in order to maintain a minimum level of battery capacity based on a battery capacity life model. It should be appreciated that manual input block 103 is optional and, thus, may be removed from method 100 or may be combined with another process, such a data input block 107.

Upon confirming that the operator of the host vehicle wishes to participate in V2X, method 100 begins collecting the necessary data for modeling battery life at INITIAL BATTERY LIFE DATA SEEDING process block 105. In general, a vehicle controller (e.g., CPU 36 and/or cloud computing service 24 of FIG. 1) may collect, aggregate, filter, and preprocess crowd-sourced data that is generated by third-party motor vehicles. Unlike other currently available approaches that source from any and all participating vehicles, process block 105 may seed data from only select third-party vehicles that are operatively comparable to the host vehicle (e.g., same or similar make/model/trim or similar class/powertrain/RESS) and located within a predefined proximity or location of the host vehicle (e.g., same or comparable geographic region). Examples of capacity modeling metrics that may be seeded from regionally and locally similar vehicles to derive a value proposition include, without limitation: miles/year; miles/day; average miles per hour (MPH); gross charge depletion (Watt-hour per mile; Whr/mi); drive time/day (Hrs); kilowatt-hour (KWh) per mile (mi) CS (gross); charge depleting range (CDR) before vehicle implements charge-saving mode (mi); profile time (s); profile range (mi); RMS power (kW); net charge depleting (Whr/mi); charging profile; fast charges per day; total charges per day; driver take rates; charge rate; and fast charge rate.

There may be use cases in which there is not yet enough seeded data available for modeling battery life for a new enrollee with the V2X service. To redress this issue, a climate and county data shape file, such as a geospatial vector GIS shapefile, may be generated or retrieved and used to locate other operatively and regionally comparable vehicles from which data may be seeded for deriving a new enrollee battery life model. A shape file may be typified as a digitized map that uses coordinates and corresponding databases to create virtual borders around geographical areas with additional information from within those borders (e.g., climate, driving conditions, elevation, etc.). A GIS shapefile of the new enrollee's home state, for example, has internally delineated regions that may be intersected to find "like" or similar users to the new enrollee. From this file, population medians may be used to impute unknown inputs from the new enrollee and should offer a fairly accurate estimate of terrain (e.g., urban vs. suburban vs. backroad vs. offroad) and temperature (e.g., hot, warm, temperate, chilly, cold).

With continuing reference to FIG. 2, method 100 also accumulates user-specific data at CUSTOMER INPUTS data input block 107 in order to tailor battery life modeling on an individual-user basis. At this juncture, a BO middleware management node may survey a new enrollee for data related to their personal driving habits (e.g., aggressive vs non-aggressive), personal vehicle usage (frequency and duration of vehicle use), environment (e.g., city and state, urban or suburban, etc.), subject vehicle's present battery capacity and estimated range, etc. For data input block 107, the method 100 may receive user-specific data that is input by a driver, owner, and/or other operator of the host vehicle, e.g., through an in-vehicle HMI, a personal computing device, or other suitable medium. This user-specific data may include, among other things, an input confirming that the subject vehicle has the necessary electrical hardware/software to perform a VGI operation, an input confirming that the EVCS to which the host vehicle is connected or regularly connects is a bidirectional charger, a user-selected maximum allowable battery capacity degradation (e.g., minimum percent retained capacity), a user-selected minimum allowable vehicle driving range (e.g., desired percent retained range), a user-selected desired income, a user-selected availability for V2X (e.g., days/times/length), etc.

Using the seeded battery life data retrieved at block 105 and the user-specific data retrieved at block 107, method 100 produces an estimated battery life for the battery pack of the host vehicle at LIFE MODEL RUN cloud computing block 109. A battery life model may forecast a percent retained battery capacity (% RC) of a subject host vehicle's RESS battery pack as a function of battery field use (years of field usage or "YFU"). A battery life model may be run against the user-specific and crowd-sourced data using an unabridged "full" battery life model, a "light-weight" (lite) version of the battery life model, and/or a parallelized computing run of the battery life model. A lite version of the battery life model may be typified as a more "coarse" run of the different input parameters of the full life model as a full factorial within a predetermined input space (e.g., prepopulate a predefined set of outputs and interpolate to define missing points between existing values). This lite battery life model may be used to generate memory-stored lookup tables with associated values (e.g., battery capacity vs. operational life expectancy) that can be interpolated in real-time to find a best estimate of battery life based on a particular end user. By comparison, a parallelized computing run may include performing a complete life model calculation on each of multiple discrete executors, e.g., in a BO big-data server computing environment. These parallel life model computations may be used to generate memory-stored lookup tables from which model data may be derived by "stitching together" the various model runs.

Continuing with the preceding discussion, a predicted battery life of a host vehicle's battery pack resulting from the host vehicle's participation in VGI operations may be estimated using a non-iterative, non-recursive closed-form battery life model. By way of non-limiting example, the battery life model may be a closed-form mathematical expression that executes a finite number of standard operations to combine a calendar life parameter and a cycle life parameter of lithium-ion battery cells. In this regard, the battery life model may incorporate a multiparameter hypergeometric function of a calendar life test data parameter and a cycle life data parameter. The closed-form equations may estimate battery life for a given capacity retention, or vice versa, for both linear and nonlinear battery degradation based on test data. This approach contrasts to many state-of the art techniques that entail estimating battery life through both iterative and recursive approaches, which involves significant computation time and resources and, thus, limits the number of simulations being performed within a reasonable timeframe. The proposed non-recursive, closed-form solution has been shown to be 500 to 1000 times faster than comparable techniques and, at the same time, highly accurate for a given set of battery life data inputs. In addition, the proposed model may be adapted for implementation for an assortment of different battery types and system architectures. If desired, the proposed non-recursive, closed-form solution may be adapted for algorithms that predict battery health (State of Health or "SOH") and other related battery operating metrics. While block 109 is shown as a lone operation performed by a remote cloud-computing service, it should be appreciated that any or all of the illustrated operations may be formed locally by a resident vehicle controller or controller network, remotely by an off-board controller or controller network, or any combination of both.

Prior to, contemporaneous with, or after executing the life model run at cloud computing block 109, method 100 may retrieve power rate data and vehicle output data at PUC RATE/THROUGHPUT DATA input process block 111. For instance, cloud computing service 24 of FIG. 1 may regularly communicate with local power utility companies, building management companies, and other potential buyers in order to accumulate real-time public utility commission rates and related commodity pricing for purchasing electrical power stored in privately owned motor vehicles. In this example, the vehicle CPU 36 may aggregate and transmit to the cloud computing service 24 real-time vehicle throughput data that identifies the amount of energy that is presently available for sale from the subject host vehicle.

Method 100 of FIG. 2 advances from data input process block 111 to VALUE PROPOSITION predefined process block 113 to forecast a total expected income for the host vehicle's participation in V2X given the available battery life data and user-specific constraints. Using the above-described seeded data inputs (e.g., comparable vehicle battery use, capacity, life expectancy, etc.) and user inputs (e.g., daily charging location indoors, nightly vehicle storage thermally controlled, acceptable loss of range, acceptable loss of capacity, etc.), for example, a value proposition is estimated for a subject host vehicle to participate in a given VGI-RPF operation. In at least one implementation, a resident or remote vehicle controller uses the predicted battery life (block 109), a Time of Use (ToU) parameter (block 107), and a Public Utility Company (PUC) rate parameter (block 111) to estimate a value proposition (block 113) that is indicative of a predicted value and a predicted battery capacity for the host vehicle performing a single or multiple VGI operations. The predicted value contained in the value proposition may include an estimated total income (e.g., monthly payment after processing and management fees) the operator of the host vehicle will receive by performing the VGI operation(s).

As seen at MANAGED V2X THROUGHPUT predefined process block 115, the value proposition may contain a predicted battery capacity, which may be in the nature of a percent battery degradation (percent retained capacity or % RC) as a function of battery life expectancy (years of field usage or YFU). In the illustrated example, the predicted battery capacity is plotted on a two-dimensional cartesian plane with the percent retained capacity on the Y-axis and the years of field usage on the X-axis. There are three predicted battery capacity value propositions provided in the illustrated plot: (1) the bottom line on the plot represents an example of a predicted battery capacity for a V2X-income driven use case scenario; (2) the middle line on the plot represents an example of a predicted battery capacity for an unmanaged V2X use case scenario; and (3) the top line on the plot represents an example of a predicted battery capacity for an optimized V2X use case scenario. In accord with the disclosed concepts, participation of an enrollee's host vehicle in VGI-RPF operations may be managed in accordance with the optimized predicted battery capacity to generate a specific income while retaining a minimum battery capacity.

After estimating a value proposition at predefined process block 113 and, from that value proposition, optimizing managed V2X throughput at block 115, method 100 responsively governs operation of one or more of the host vehicle's resident subsystems to execute one or more automated control operations that facilitate VGI RPF based on the value proposition. In accord with the illustrated example, the method 100 proceeds to CUSTOMER INCOME GENERATION display block 117 to output an electronic notification to the vehicle operator with an indication of the estimated income they will receive from the VGI operation or operations. At CAPACITY RETENTION display block 119, method 100 outputs an electronic notification to the vehicle operator with an indication of the percent retained battery capacity resulting from the VGI operation or operations. For display blocks 117 and 119, a resident vehicle controller, such as CPU 36 of FIG. 1, may command an in-vehicle display device, such as telematics touchscreen display 18, to show the predicted value and the predicted battery capacity degradation. At this juncture, the vehicle owner may be prompted to approve or reject participation in future VGI operation(s). If rejected, a resident vehicle controller, such as CPU 36 of FIG. 1, may transmit one or more command signals to the EBCM 56 to prevent the host vehicle from performing a VGI operation (e.g., when battery degradation is too high or estimated income is too low).

When the vehicle operator accepts the initial V2X proposition and concomitant management, data input convergence may begin. Generally speaking, input convergence of the user-specific data and the crowd-sourced data may include continually receiving updated user-specific data and replacing the existing user-specific data with updated user-specific data in order to converge on an average use case specific to a subject host vehicle. Each time a set of updated user-specific data is received, the method 100 may estimate a new predicted battery life using the battery life model based on a reduced portion of crowed-sourced data and on the updated user-specific data. As the operator of the host vehicle continues to operate normally, including selling back energy to the PUC, the BO vehicle services system gathers individualized duty cycle information for a more accurate optimization of V2X throughput. As time progresses, crowd-sourced regional data is slowly phased out with an increased emphasis on vehicle-specific data (e.g., pack temperature, drive efficiency data, actual capacity, actual available throughput, etc.). Over time, the system is able to learn more about a specific individual customer's driving behavior and vehicle operation (e.g., a user who rarely drives in a state with cooler/cold weather (Vermont) will achieve a higher VG2 value proposition than a user who drives in a state with warm/hot weather (Arizona)).

If there is a divergence in capacity loss estimates, the managed V2X throughput optimization may be systematically updated and, if desired, the vehicle owner likewise notified. For instance, if the read capacity differs from the battery life model given the same input(s) over a number of samples "n", the system may recalibrate the model to better fit the measured values from the vehicle. The battery life model continues to be run, e.g., weekly, to facilitate this optimization on a frequent basis and thereby ensure that there is no drift. The vehicle operator may be provided with a regular dashboard update showing recent generated income, total generated income, future expected income, etc., as well as a status regarding actual (measured) battery capacity loss being in-line with what was expected. The vehicle operator may also be provided with PUC rate data, ToU-specific data, total throughput (kWh sent to the grid), etc.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of controlling a vehicle grid integration (VGI) operation of a host vehicle having a rechargeable battery pack connectable to a charging station, the method comprising:

receiving, via a vehicle controller, user-specific data input by an operator of the host vehicle;

receiving, via the vehicle controller, crowd-sourced data output by multiple third-party vehicles deemed operatively comparable to the host vehicle and located within a predefined region of the host vehicle;

estimating, using a non-iterative and non-recursive closed-form battery life model based on the user-specific data and the crowd-sourced data, a predicted battery life of the rechargeable battery pack resulting from the host vehicle performing the VGI operation, the battery life model including a multiparameter hypergeometric function using battery life test data and battery cycle life data associated with the rechargeable battery pack of the host vehicle;

determining, via the vehicle controller using the predicted battery life, a value proposition indicating a predicted value and a predicted battery capacity for the host vehicle performing the VGI operation; and commanding, via the vehicle controller, a resident subsystem of the host vehicle to execute an automated control operation for performing the VGI operation based on the value proposition, the automated control operation including a reverse power flow (RPF) transfer of power from the rechargeable battery pack of the host vehicle to a power grid through the charging station.

2. The method of claim 1, further comprising receiving, via the vehicle controller, utility company rate data for purchasing electrical power from the host vehicle, wherein the value proposition is further determined based on the utility company rate data.

3. The method of claim 1, further comprising receiving, via the vehicle controller from the host vehicle, vehicle throughput data indicative of an amount of energy available from the host vehicle, wherein the value proposition is further determined based on the vehicle throughput data.

4. The method of claim 1, wherein the predicted value indicated by the value proposition includes an estimated total income the operator of the host vehicle will receive by performing the VGI operation.

5. The method of claim 1, wherein the predicted battery capacity indicated by the value proposition includes a percent battery degradation as a function of battery life expectancy.

6. The method of claim 1, further comprising performing an input convergence of the user-specific data input and the crowd-sourced data by repeatedly receiving updated user-specific data and replacing the user-specific data with the updated user-specific data to converge on an average use case specific to the host vehicle.

7. The method of claim 6, further comprising estimating a new predicted battery life each time a set of the updated user-specific data is received using the battery life model based on a reduced portion of the crowed-sourced data and on the updated user-specific data.

8. The method of claim 1, wherein the user-specific data input by the operator of the host vehicle includes an indication that the host vehicle is configured to perform the VGI operation and/or the charging station to which the host vehicle is connectable is a bidirectional charger.

9. The method of claim 1, wherein the user-specific data input by the operator of the host vehicle includes a user-selected maximum allowable battery capacity degradation and/or a user-selected minimum allowable vehicle driving range.

10. The method of claim 1, wherein the multiparameter hypergeometric function executes a finite number of standard operations to combine a calendar life test data parameter and a cycle life data parameter.

11. The method of claim 1, wherein the resident subsystem includes an Electronic Battery Control Module (EBCM), and wherein the automated control operation further includes the EBCM preventing the host vehicle from performing the VGI operation responsive to the value proposition being below a predefined threshold.

12. The method of claim 1, wherein the resident subsystem includes an electronic display device mounted inside the host vehicle, and wherein the automated control operation further includes the electronic display device displaying indications of the predicted value and the predicted battery capacity degradation.

13. The method of claim 1, wherein the vehicle controller includes a resident vehicle controller resident to the host vehicle and a remote vehicle controller of a middleware computing service remote from the host vehicle, the resident vehicle controller receiving the user-specific data and transmitting the command signal, and the remote vehicle controller receiving the crowd-sourced data, estimating the predicted battery life, and determining the value proposition.

14. A non-transitory, computer-readable medium storing instructions executable by one or more processors of a vehicle controller to control a vehicle grid integration (VGI) operation of a host vehicle, the host vehicle having a rechargeable battery pack connectable to a charging station, the instructions, when executed by the one or more processors, causing the vehicle controller to perform operations comprising:

receiving user-specific data input by an operator of the host vehicle;

receiving crowd-sourced data output by third-party vehicles deemed operatively comparable to the host vehicle and located within a predefined region of the host vehicle;

estimating, using a non-iterative and non-recursive closed-form battery life model based on the user-specific data and the crowd-sourced data, a predicted battery life of the rechargeable battery pack resulting from the host vehicle performing the VGI operation, the battery life model including a multiparameter hypergeometric function using battery life test data and battery cycle life data associated with the rechargeable battery pack of the host vehicle;

determining, using the predicted battery life, a value proposition indicating a predicted value and a predicted battery capacity for the host vehicle performing the VGI operation; and commanding a resident subsystem of the host vehicle to execute an automated control operation for performing the VGI operation based on the value proposition, the automated control operation including a reverse power flow (RPF) transfer of power from the rechargeable battery pack of the host vehicle to a power grid through the charging station.

15. A motor vehicle, comprising:

a vehicle body with a passenger compartment;

a plurality of road wheels attached to the vehicle body;

a traction motor attached to the vehicle body and operable to drive one or more of the road wheels to thereby propel the motor vehicle;

a traction battery pack attached to the vehicle body and electrically connected to the traction motor; and a vehicle controller programmed to:

receive user-specific data input by an operator of the motor vehicle;

receive crowd-sourced data output by multiple third-party vehicles deemed operatively comparable to the motor vehicle and located within a predefined region of the motor vehicle;

estimate, using a non-iterative and non-recursive closed-form battery life model based on the user-specific data and the crowd-sourced data, a predicted battery life of the rechargeable battery pack resulting from the motor vehicle performing the VGI operation, the battery life model including a multiparameter hypergeometric function using battery life test data and battery cycle life data associated with the rechargeable battery pack of the motor vehicle;

determine, using the predicted battery life, a value proposition indicating a predicted value and a predicted battery capacity for the motor vehicle performing the VGI operation; and command a resident subsystem of the motor vehicle to execute an automated control operation for performing the VGI operation based on the value proposition, the automated control operation including a reverse power flow (RPF) transfer of power from the rechargeable battery pack of the motor vehicle to a power grid through the charging station.

16. The motor vehicle of claim 15, wherein the vehicle controller is further programmed to receive a utility company rate for purchasing electrical power from the host motor vehicle, wherein the value proposition is further determined based on the utility company rate.

17. The motor vehicle of claim 15, wherein the vehicle controller is further programmed to receive vehicle throughput data indicative of an amount of energy available from the host motor vehicle, wherein the value proposition is further determined based on the vehicle throughput data.

18. The motor vehicle of claim 15, wherein the predicted value indicated by the value proposition includes an estimated total income the operator of the motor vehicle will receive by performing the VGI operation, and wherein the predicted battery capacity indicated by the value proposition includes a percent battery degradation as a function of battery life expectancy.

19. The motor vehicle of claim 15, wherein the battery life model includes a multiparameter hypergeometric function of a calendar life test data parameter and a cycle life data.

20. The motor vehicle of claim 15, wherein the vehicle controller includes a resident vehicle controller resident to the motor vehicle and a remote vehicle controller of a middleware computing service remote from the motor vehicle, the resident vehicle controller receiving the user-specific data and transmitting the command signal, and the remote vehicle controller receiving the crowd-sourced data, estimating the predicted battery life, and determining the value proposition.

* * * * *